(No Model.)
M. BRIDGES.
VALVE FOR PNEUMATIC TIRES.
No. 529,588. Patented Nov. 20, 1894.
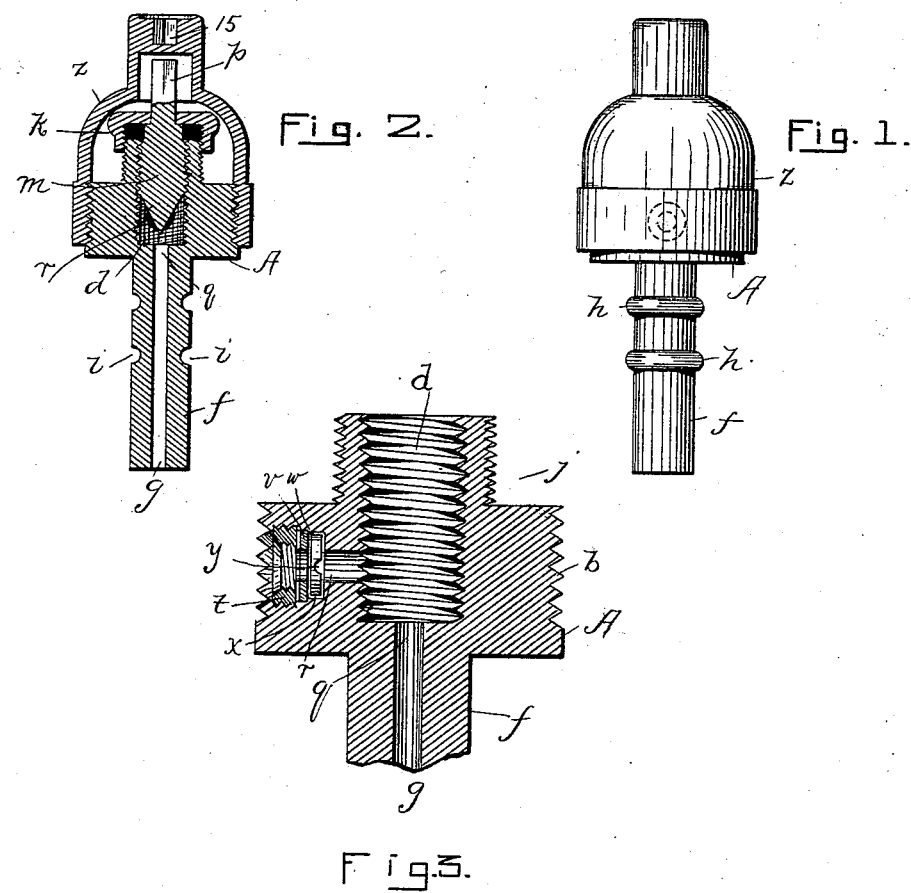

UNITED STATES PATENT OFFICE.

MICHAEL BRIDGES, OF BOSTON, MASSACHUSETTS.

VALVE FOR PNEUMATIC TIRES.

SPECIFICATION forming part of Letters Patent No. 529,588, dated November 20, 1894.

Application filed January 8, 1894. Serial No. 496,144. (No model.)

*To all whom it may concern:*

Be it known that I, MICHAEL BRIDGES, of Boston, in the county of Suffolk, State of Massachusetts, have invented certain new and useful Improvements in Valves for Pneumatic Tires, of which the following is a description sufficiently full, clear, and exact to enable any person skilled in the art or science to which said invention appertains to make and use the same, reference being had to the accompanying drawings, forming part of this specification, in which—

Figure 1 is a side elevation enlarged of my improved valve; Fig. 2, a vertical transverse section showing a modified form of Fig. 1, and Fig. 3, an enlarged section of the body portion of the valve.

Like letters and numerals of reference indicate corresponding parts in the different figures of the drawings.

My invention relates especially to a valve for inflating pneumatic-tires of bicycles; and it consists in certain novel features hereinafter fully set forth and claimed, the object being to produce a simple, cheap and effective device of this character.

In the drawings, A represents the body of the valve which is exteriorly screw-threaded at, $b$, and is tapped and interiorly screw-threaded at, $d$, forming a valve-chamber. A stem, $f$, leads centrally from the body and a port, $g$, therein opens into the bottom of the chamber, $d$. Said stem may be corrugated at, $h$, or grooved as at, $i$, to hold it in the tire and felly, or rim through which it is disposed. The body is reduced around the mouth of the chamber, $d$, and exteriorly screw-threaded at, $j$, to receive a cap. A conical shut-off valve or plug, $m$, is turned into the valve chamber and has its stem, $p$, squared to receive a wrench. The gasket, $k$, surrounds said stem, and the point of the valve seats in the inner end of the port, $g$, at, $q$, when turned in. Said valve is composed of any composition which will when turned against its seat form an air-tight joint.

Laterally through the body, A, a port, $r$, opens into the chamber, $d$. Said port is enlarged at its outer end and an interiorly and exteriorly threaded nipple, $t$, is turned therein, said nut being adapted to receive the discharge of an air pump. The nut binds a soft rubber washer, $v$, against a shoulder, $w$, in the port, said washer forming a seat for a check-valve, $x$, which comprises a disk grooved on its inner face, $y$, to admit air around it into the chamber, $d$. A screw-cap, $z$, turned onto the body incloses the valve, $m$, preventing grit from entering and serving as an additional precaution against the escape of air, said cap also closing the mouth of the nipple, $t$. The top of said cap has a square sink, 15, and will serve as a wrench.

In the use of my improvement when it is desired to inflate the tire the cap, $z$, is turned off and its wrench opening, 15, applied to the stem, $p$, whereby the valve, $m$, is turned out until the port, $g$, is open. The air-pump may now be attached to the nipple, $t$. The pressure of air within the tire forces the check-valve, $x$, against its seat, $v$, and prevents the escape of the air. When the pump is actuated the valve, $x$, is driven in the opposite direction and air discharged from said pump enters through the groove, $y$, and port, $r$, into the chamber, $d$, and thence into the tire. On the back stroke of the pump the check-valve is closed by the pressure within the tire in a manner which will be readily understood by those conversant with such matters without a more explicit description.

The pump can be detached without loss of air, the stop valve, $m$, screwed down onto its seat, $q$, and the cap replaced.

Having thus explained my invention, what I claim is—

The combination with the valve body, A, provided with the stem, $f$, having the port, $g$, and seat, $q$; of the conical screw-valve, $m$, for engaging said seat; the laterally opening enlarged port, $r$; the interiorly and exteriorly screw-threaded nipple, $t$, turned into said port; the check valve, $x$, having the grooved face engaging a shoulder, $w$, in said port; and the screw-cap, $z$, having the sink, 15, all being arranged to operate substantially as described.

MICHAEL BRIDGES.

Witnesses:
K. DURFEE,
O. M. SHAW.